R. McKenzie.
Tube-Expander.
N°96,133. Patented Oct. 26, 1869.

Witnesses:
H. N. Jenkins
Rufus R. Rhodes

Inventor,
Robert McKenzie

United States Patent Office.

ROBERT McKENZIE, OF NEW ORLEANS, LOUISIANA.

Letters Patent No. 96,133, dated October 26, 1869.

IMPROVED TOOL FOR EXPANDING BOILER-TUBES.

The Schedule referred to in these Letters Patent and making part of the same.

*To all whom it may concern:*

Be it known that I, ROBERT McKENZIE, of the city of New Orleans, State of Louisiana, have invented a certain new and useful Improvement in Machines for Expanding Metallic Tubes; and I do hereby declare the following to be a full, clear, and exact description of the same, reference being had to the annexed drawing, making a part of this specification, on which—

Figure 1:
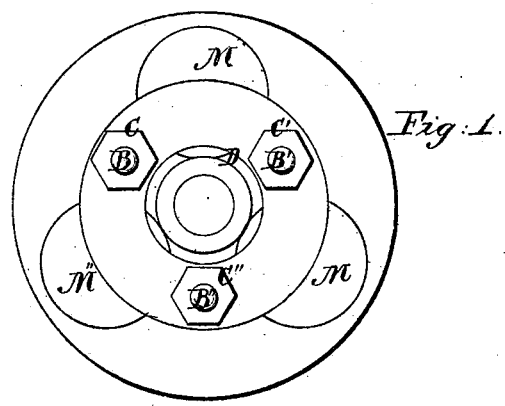
Figure 2:
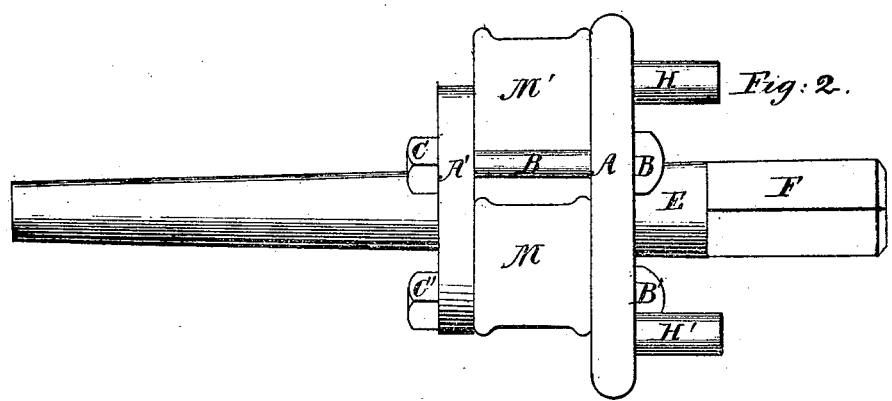
Figure 3:
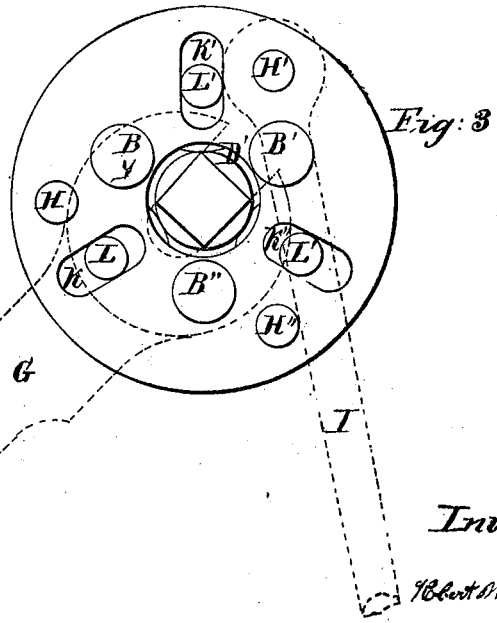

Figure 1 is a rear,
Figure 2 a side, and
Figure 3, a front view of it.

My invention is an improvement on R. Dudgeon's roller-tube expander, in several important particulars, although it operates on the same general principles; and It consists of an arrangement of a number of mechanical parts, hereinafter enumerated and particularly described, in such a manner as to allow the expanding rolls of the machine to be readily removed, and others of greater or less diameter substituted in their place, with the object of adapting the machine to tubes of different diameters.

But my invention will be better understood by referring to the drawing, on which the same letters denote the same parts at all the figures.

For a machine designed to expand the ends of tubes of from three to six inches in diameter, which should be about one-third larger than as shown on the drawing, I provide two circular plates or washers, A A', and secure them in parallel relation and planes to each other, with an interval or space between them, of from one inch to one inch and a half, by means of three bolts, B B' B'', the washer A being held immovably in said relation, by means of collars cut on the said bolts, or by encircling-sockets or thimbles, slipped over them, and by the nuts C C' C''.

Through the centres of both the washers A A, circular apertures D D', are made, in such manner that the axes of the same are precisely coincident to each other, to provide for the introduction of a tapering mandrel, E, the larger extremity F, of which, is made square in order that it may be moved by a wrench, G, as shown in red lines at fig. 3.

The plate A is provided, on its front face, with three projecting pins, H H' H'', which constitute a means for applying and using with great effect a lever, I, in the practice of the invention, as shown in red lines also at fig. 3, the said pins being placed at equal distances apart, and near the outer edge of the plate.

Three elongated apertures or slots, K K' K'', are, moreover, cut through plate A to receive the axes L L' L'' or of rollers M M' M'', and to allow the latter to be forced outwardly in the actual use or practice of the machine, and to adapt the same to tubes, which vary in diameter to the extent of the length of said slots without changing the rollers for others of different diameter.

On the end of the rollers M M' M'', which abut against the washer A', there is no axis, properly so called, nor any support, except what is given by the contact of two smooth surfaces.

In fact, the axes of L L' L'' give no support, in strictness of language, to the said rollers, the mandrel doing that, for they are designed merely to maintain them in their places and control the measure of their adjustment. If the tube be too large to be expanded by the rollers that are in the machine, they are taken out and larger ones substituted in their stead. For smaller tubes than three inches, a smaller machine should be used, and for tubes of more than six inches' diameter, a larger machine.

The operation of my invention is as follows:

The machine is put in the tube, and then the mandrel is inserted in the central aperture, and driven in with a hammer or mallet, until it forces the rollers hard against the inner surface of the tube, and then it is revolved three or four times by means of the wrench $G_1$, or until the tube has been expanded to the required extent. If there should be any inequalities on the interior surface of the tube, or an overlapping at the point at which the sheet or plate composing it is brought together, which prevents the easy rotation of the machine, the lever I, by being applied as shown at fig. 3, will at once afford a means of overcoming the difficulty. After one revolution is effected, there will be no further trouble in that behalf, and the lever I will not need to be further used. After a tube has been sufficiently expanded, a few slight taps with a hammer on the square part of the mandrel will loosen it, and allow the machine to be withdrawn. The mandrel and rollers are made of the best cast-steel.

Having thus described my invention,

What I claim, and desire to secure by Letters Patent, is—

The annular and slotted plates A A', screw-bolts and nuts B C, constituting a frame substantially as described, in combination with a series of sets of rolls of different sizes, each with one journal only, the projecting pins H, lever I, and tapered mandrel E, all constructed and arranged substantially as set forth.

ROBERT McKENZIE.

Witnesses:
H. N. JENKINS,
RUFUS R. RHODES.